United States Patent
Bae et al.

(10) Patent No.: US 9,481,354 B2
(45) Date of Patent: Nov. 1, 2016

(54) EMERGENCY OPERATION METHOD OF HYBRID VEHICLE

(71) Applicant: HYUNDAI MOTOR COMPANY, Seoul (KR)

(72) Inventors: Su Hyun Bae, Daegu (KR); Sung Kyu Kim, Bucheon-si (KR); Mu Shin Kwak, Osan-si (KR); Hong Geuk Park, Cheonan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/706,684

(22) Filed: May 7, 2015

(65) Prior Publication Data
US 2015/0321664 A1   Nov. 12, 2015

(30) Foreign Application Priority Data

May 8, 2014  (KR) ........................ 10-2014-0054521
Dec. 29, 2014  (KR) ........................ 10-2014-0191574

(51) Int. Cl.
| B60W 10/06 | (2006.01) |
| B60W 20/00 | (2016.01) |
| B60W 10/08 | (2006.01) |
| B60W 10/02 | (2006.01) |
| B60W 10/26 | (2006.01) |

(52) U.S. Cl.
CPC .............. *B60W 10/06* (2013.01); *B60W 10/02* (2013.01); *B60W 10/08* (2013.01); *B60W 10/26* (2013.01); *B60W 20/00* (2013.01); *B60W 20/50* (2013.01); *B60W 2400/00* (2013.01); *B60W 2560/00* (2013.01); *B60W 2710/021* (2013.01); *B60W 2710/06* (2013.01); *B60W 2710/083* (2013.01); *Y10S 903/93* (2013.01)

(58) Field of Classification Search
None
See application file for complete search history.

(56) References Cited

U.S. PATENT DOCUMENTS

| 5,916,291 | A | * | 6/1999 | McKee | ................ | B60W 10/02 |
| | | | | | | 192/3.58 |
| 8,504,231 | B2 | | 8/2013 | Kim | | |
| 8,660,729 | B2 | * | 2/2014 | Miyazaki | .............. | B60L 3/0023 |
| | | | | | | 180/65.285 |
| 8,838,310 | B2 | * | 9/2014 | Tomatsuri | .............. | B60K 6/365 |
| | | | | | | 123/568.11 |
| 8,884,577 | B2 | * | 11/2014 | Tsuji | ....................... | H02M 1/32 |
| | | | | | | 318/400.21 |
| 9,346,364 | B2 | * | 5/2016 | Park | ........................ | B60L 11/14 |
| 2011/0133549 | A1 | * | 6/2011 | Song | ..................... | B60L 3/003 |
| | | | | | | 307/10.1 |

(Continued)

FOREIGN PATENT DOCUMENTS

| KR | 10-2008-0014395 A | 2/2008 |
| KR | 10-2008-0087487 A | 10/2008 |

(Continued)

*Primary Examiner* — Redhwan K Mawari
*Assistant Examiner* — Edward Torchinsky
(74) *Attorney, Agent, or Firm* — McDermott Will & Emery LLP (57) ABSTRACT

An emergency operation method of a hybrid vehicle, which includes an engine, a first motor connected to the engine through an engine clutch and transmitting power to a vehicle wheel, and a second motor connected with the engine to directly transmit power, includes charging a DC-link terminal with a first counter electromotive force of the first motor and the second motor generated by driving energy of the vehicle or power from the engine when a main relay is off while the vehicle travels. A voltage of the DC-link terminal is controlled by using a second inverter which is connected between the DC-link terminal and the second motor in a driving state of the engine. Power is supplied by using the DC-link terminal, of which the voltage is controlled, for an emergency operation of the vehicle.

23 Claims, 5 Drawing Sheets

(56) References Cited

U.S. PATENT DOCUMENTS

2011/0276213 A1\* 11/2011 Tomatsuri .............. B60K 6/365 701/22
2014/0183941 A1\* 7/2014 Bae ...................... B60L 3/0069 307/10.1

FOREIGN PATENT DOCUMENTS

| KR | 10-0901564 B1 | 6/2009 |
| KR | 10-2009-0108325 A | 10/2009 |
| KR | 10-2012-0005746 A | 1/2012 |
| KR | 10-2014-0087581 A | 7/2014 |

\* cited by examiner

FIG.1

-- Related Art --

FIG.2

-- Related Art --

EMERGENCY OPERATION METHOD OF HYBRID VEHICLE

CROSS-REFERENCE TO RELATED APPLICATION

This application claims under 35 U.S.C. §119(a) the benefit of priority to Korean Patent Application Nos. 10-2014-0054521 and 10-2014-0191574 filed on May 8, 2014 and Dec. 29, 2014, respectively, the entire contents of which are incorporated herein by reference.

TECHNICAL FIELD

The present disclosure relates to an emergency operation method of a hybrid vehicle. More particularly, the present disclosure relates to an emergency operation method of a hybrid vehicle by which the vehicle is driven in an emergency when a high voltage main relay is abnormally off.

BACKGROUND

A hybrid vehicle efficiently combines two or more distinct power sources. In general, the hybrid vehicle combines an internal combustion engine which obtains rotational force by combusting a fuel, and one or more electric motors which obtain rotational force from electrical energy of a battery.

Power transmission of the hybrid vehicle may be variously configured with the engine and the motor, and the most common power transmission is a parallel power transmission or a serial power transmission.

The hybrid vehicle may output optimum output torque according to synchronization of the engine and the motor by utilizing two power sources, that is, the engine and the motor.

The hybrid vehicle can travel in an electric vehicle (EV) mode that is a pure electric vehicle mode using only power from the motor or in a hybrid electric vehicle (HEV) mode which uses both power from the engine and power from the motor.

During braking of the vehicle or coasting of the vehicle by inertia, braking and inertia energy is collected through generation of the motor in a regenerative braking (RB) mode.

A typical hybrid vehicle drive train has an engine clutch installed between the engine and the motor. The engine, the engine clutch, the motor (driving motor), and a transmission are sequentially arranged. A battery is connected to the motor to be charged/discharged through a power converter.

Figure 1:
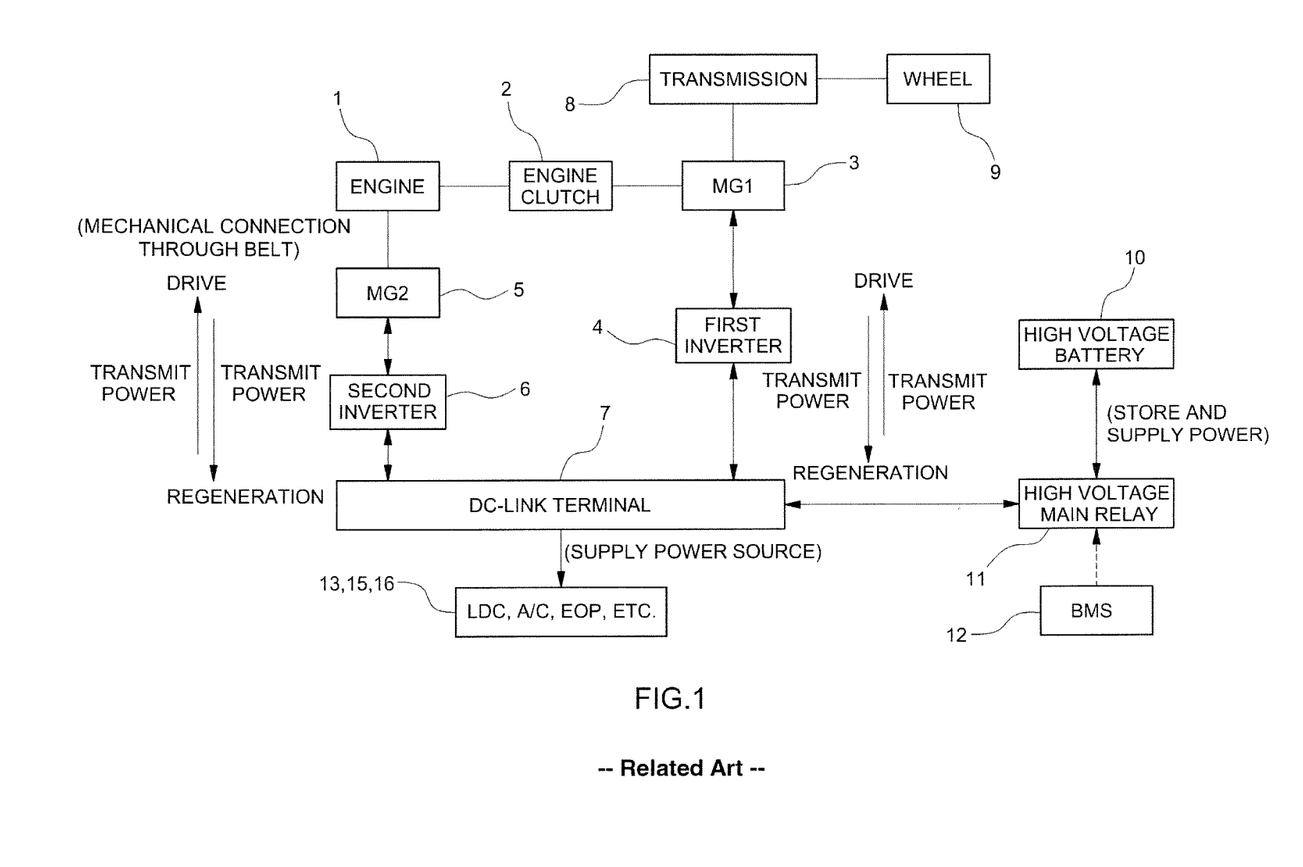
FIGS. 1 and 2 are diagrams illustrating a main configuration of a hybrid vehicle.
Figure 2:
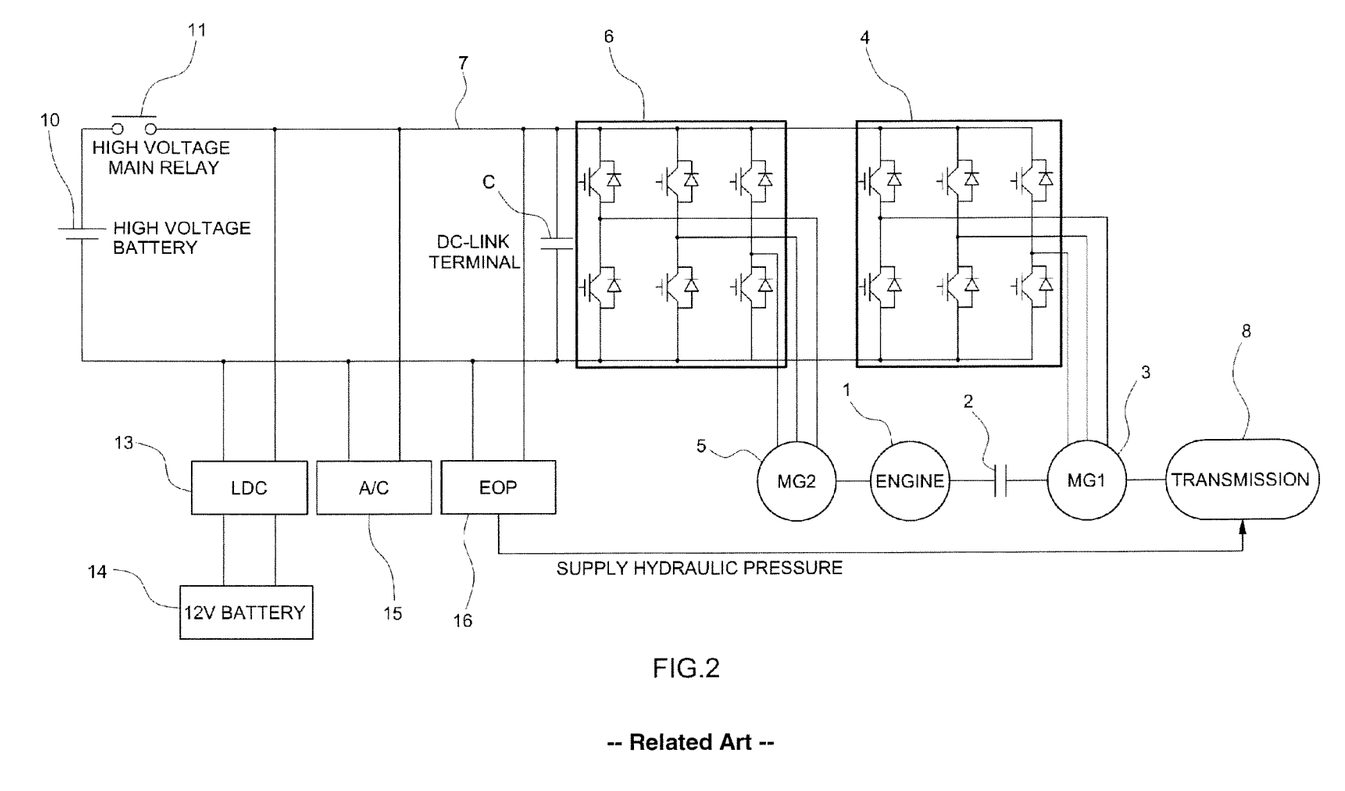

FIGS. 1 and 2 are diagrams illustrating main configurations of a hybrid vehicle including two motors (MG1 and MG2) 3 and 5. An engine clutch 2 is interposed between an engine 1 and the first motor (MG1) 3 driving the vehicle. The engine 1 and the first motor (MG1) 3 are mechanically connected by the engine clutch 2 to transmit power or are disconnected to block the power transmission between the first motor 3 and the engine 1.

The first motor 3 is mechanically connected to a wheel 9 of the vehicle through a transmission 8 to transmit the power. When both of the engine 1 and the first motor 3 are driven, the power may be transmitted to the wheel 9 through the transmission 8.

The second motor (MG2) 5 is mechanically connected to the engine 1 through a belt and the like to transmit the power. The hybrid vehicle further includes a first inverter 4 for driving the first motor 3 and a second inverter 6 for driving the second motor 5. The first inverter 4 and the second inverter 6 are connected to a high voltage battery (main battery) 10 through a DC-link terminal 7 having a capacitor C.

The first inverter 4 and the second inverter 6 supply regenerative power by the motors 3 and 5 while the motors 3 and 5 are regenerated through the DC-link terminal 7, or receive power from the high voltage battery 10 through the DC-link terminal 7 for driving the motors 3 and 5.

High voltage components, such as a low voltage DC to DC converter (LDC) 13, an air compressor (A/C) 15, and an electronic oil pump (EOP) 16 which will be described below, as well as the first inverter 4 and the second inverter 6, receive high voltage power through the DC-link terminal 7.

A main relay 11 for selectively supplying/blocking the power of the high voltage battery 10 is mechanically connected between the high voltage battery 10 and the DC-link terminal 7 to block the power supply between the high voltage battery 10 and the DC-link terminal 7. The main relay 11 is controlled to be on/off by a battery management system (BMS) 12, and the high voltage battery 10 supplies or receives and stores the power through the main relay 11.

A low voltage battery (auxiliary battery) 14 of 12V and a low voltage electronic load (not illustrated) are connected through the LDC 13. The high voltage components such as the A/C 15 and the EOP 16 are connected to the DC-link terminal 7 so as to receive the power from the high voltage battery 10.

The LDC 13 in the hybrid vehicle serves as an alternator for a conventional gasoline engine, and converts the power between the high voltage power supply and the low voltage electronic load (the low voltage battery or other low voltage electronic loads within the vehicle). The LDC 13 further steps down a DC voltage of the high voltage power supply within the vehicle such as the high voltage battery 10 and supplies the step-down voltage to the low voltage battery 14 and other low voltage electronic loads.

That is, the LDC 13 converts the high voltage DC voltage from the high voltage battery 10 and the high direct voltage of regenerative energy of the motors 3 and 4 to charge the low voltage battery 14 with the converted voltage or supply the converted voltage to the low voltage electronic loads.

When the main relay 11, which provides a high voltage between the high voltage battery 10 and the DC-link terminal 7, the inverters 4 and 6, is abnormally off while the hybrid vehicle is running, the inverters 4 and 6 cannot receive the high voltage and thus cannot function properly.

The LDC 13 also cannot receive the high voltage, and thus, it is impossible to charge the low voltage battery 14, and the LDC 13 cannot supply power to the low voltage electronic load.

In this case, the low voltage (12V) electronic load continuously consumes the power from the low voltage battery 14, and as a result, the low voltage battery 14 is discharged.

Particularly, when the low voltage battery 14 is discharged when the vehicle is running, controllers receiving the power from the low voltage battery 14 in the vehicle stop operating.

For example, when the low voltage battery 14 is discharged to a predetermined voltage or lower, a control power supply of a motor driven power steering (MDPS) device of a vehicle is turned off, and thus, a steering wheel locking occurs when the low voltage battery 14 is discharged.

When the high voltage main relay 12 is turned off, other various high voltage components such as the A/C 15 and the EOP 16 which receive the power from the high voltage battery 10 stop operating. If the EOP 16, which supplies hydraulic pressure to the transmission 8, does not function, hydraulic pressure is not formed within the transmission 8 so that it is impossible to operate the vehicle.

In contrast to a vehicle using both a mechanical oil pump and an electronic oil pump, when the main relay does not function properly in a vehicle having only a high voltage electronic oil pump due to failure of another high voltage component while the vehicle is running, the electronic oil pump cannot also receive a driving power source so that it is impossible to form hydraulic pressure within the transmission and operate the vehicle.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

The present disclosure has been made in an effort to solve the above-described problems associated with the prior art, and to provide a method of smoothly driving a high voltage component such as a low voltage DC to DC converter and an electronic oil pump driven at high voltage even in a situation where a high voltage main relay of a hybrid vehicle does not function properly, and enabling the hybrid vehicle having the high voltage component to perform an emergency operation in a limp-home mode.

According to an exemplary embodiment of the present inventive concept, an emergency operation method of a hybrid vehicle, which includes an engine, a first motor connected to the engine through an engine clutch and transmitting power to a vehicle wheel, and a second motor connected with the engine to directly transmit power, includes charging a DC-link terminal with a first counter electromotive force of the first motor generated by driving energy of the vehicle transmitted from the vehicle wheel or a second counter electromotive force of the second motor generated by power of the engine when a main relay is off while the vehicle travels. A voltage of the DC-link terminal is controlled by using a second inverter connected between the DC-link terminal and the second motor in a driving state of the engine. Power is supplied by using the DC-link terminal, of which the voltage is controlled, for an emergency operation of the vehicle. When controlling the voltage of the DC-link terminal, a torque of the first motor is controlled to be zero.

According to another embodiment of the present inventive concept, an emergency operation method of a hybrid vehicle, which includes an engine, a first motor connected to the engine through an engine clutch and transmitting power to a vehicle wheel, and a second motor connected with the engine to directly transmit power, includes charging a DC-link terminal with a first counter electromotive force of the first motor generated by driving energy of the vehicle transmitted from the vehicle wheel or a second counter electromotive force of the second motor generated by power of the engine when a main relay is off while the vehicle travels. Whether the engine clutch is in a connection state is determined. A voltage of a DC-link terminal is controlled by using a first inverter connected between the DC-link terminal and the first motor in an engine driving state and a torque of the second motor is controlled, so that an output of the second motor is equal to or smaller than a maximum output of the first motor when the engine clutch is in the connection state. Power is supplied by using the DC-link terminal, of which a voltage is controlled, for an emergency operation of the vehicle.

According to the emergency operation method of the present disclosure, it is possible to charge the DC-link terminal with the counter electromotive force generated by the first motor and the second motor, and drive a high voltage component, such as an LDC, an electronic oil pump, and an air conditioner compressor, by using the DC-link terminal, of which a voltage is controlled through the second inverter, as a power supply.

It is also possible to drive a high voltage component, and make the vehicle to travel while in an emergency by using the DC-link terminal as the power supply, and using the first motor as a driving source.

When the main relay is abnormally off during travelling of the vehicle in the EV mode as well as in the HEV mode, of the vehicle, it is possible to operate the vehicle even in the emergency, and improve voltage control performance in a high speed region when the voltage of the DC-link terminal is controlled.

Other aspects and exemplary embodiments of the inventive concept are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

It should be understood that the appended drawings are not necessarily to scale, presenting a somewhat simplified representation of various features illustrative of the basic principles of the disclosure. The specific design features of the present inventive concept as disclosed herein, including, for example, specific dimensions, orientations, locations, and shapes will be determined in part by the particular intended application and use environment.

DETAILED DESCRIPTION

Hereinafter reference will now be made in detail to various embodiments of the present inventive concept, examples of which are illustrated in the accompanying drawings and described below. While the disclosure will be described in conjunction with exemplary embodiments, it will be understood that the present description is not intended to limit the inventive concept to those exemplary embodiments. On the contrary, the inventive concept is intended to cover not only the exemplary embodiments, but also various alternatives, modifications, equivalents, and other embodiments, which may be included within the spirit and scope of the invention as defined by the appended claims.

Hereinafter, exemplary embodiments of the present inventive concept will be described in detail with reference to the accompanying drawings so that those with ordinary skill in the art to which the present inventive concept pertains may carry out the exemplary embodiment.

The present disclosure provides an emergency operation method of a hybrid vehicle, by which the vehicle may travel in an emergency in a limp-home mode (an emergency operation mode) when a high voltage main relay is abnormally off while the vehicle is running.

The main constituent elements and a role and an effect of each constituent element of a hybrid vehicle to which the present disclosure is applied, are not different from those previously described with reference to FIGS. 1 and 2, so that overlapping descriptions thereof will be omitted in the present specification hereinafter.

Figure 3:
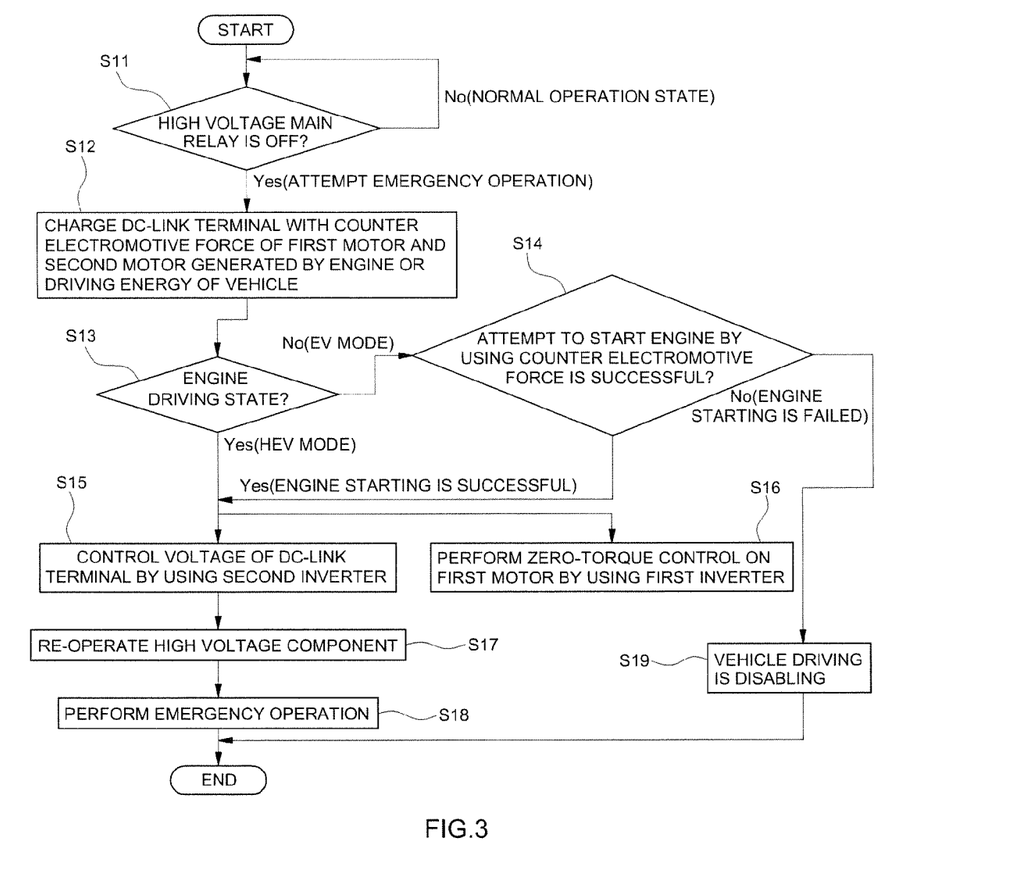
FIG. 3 is a flowchart illustrating an emergency operation method of a hybrid vehicle according to an exemplary embodiment of the present inventive concept.

FIG. 3 is a flowchart illustrating an emergency operation method of a hybrid vehicle according to an exemplary embodiment of the present inventive concept when a main relay is abnormally off during travelling of the hybrid vehicle in an electric vehicle (EV) mode as well as a hybrid electric vehicle (HEV) mode.

The main configuration of the hybrid vehicle will be described below with reference to FIG. 3 together with FIGS. 1 and 2.

First, it is determined whether a high voltage main relay 11 is off during driving of the vehicle (S11). When the main relay 11 is on and is in a normal state, a normal operation is maintained. If the main relay 11 is abnormally off, the hybrid vehicle starts an emergency operation mode (limp-home mode) in which an emergency operation is performed.

The main relay 11 may be abnormally off due to a malfunction of the main relay itself, a component (BMS and the like) related to a control of the main relay, a high voltage component, or the like.

When the hybrid vehicle enters an abnormal operation mode, a DC-link terminal 7 is charged with a counter electromotive force of a first motor (MG1) 3 generated by driving energy of the vehicle or a counter electromotive force of a second motor (MG2) 5 generated by a power of an engine 1 (S12).

Here, the counter electromotive force of the first motor 3 is regenerative energy generated by the first motor 3 by the driving energy of the vehicle transmitted from the wheel of the vehicle while the vehicle is moving, and the DC-link terminal 7 is charged with the regenerative energy generated by the first motor (MG1) 3 which is operated as a power generator by the driving energy of the vehicle.

However, when the vehicle is driven in an EV mode, in which the engine is not used, while the main relay 11 is off, the DC-link terminal 7 is charged by the counter electromotive force of the first motor 3 generated from the driving energy of the vehicle as the vehicle travels.

Even in the emergency operation mode, rotors within the first motor 3 and the second motor 5 are rotated by the driving energy of the vehicle or the power from the engine 1 while the vehicle travels, and the counter electromotive force is generated in the first motor 1 and the second motor 5 by a change in flux of stator coils.

Particularly, the first motor 3 may receive rotational force from a wheel 9 according to rotation of the wheel 9 of the vehicle as the vehicle moves. The second motor 5 is directly connected to the engine 1 by a belt and the like, so that the second motor 5 may receive rotational force of the engine 1 as the engine is running (that is, when the engine starts running).

Accordingly, the counter electromotive force is generated by the change in the flux of the stator coils according to the rotation of the rotors of the first motor 3 and the second motor 5 even in the situation where the main relay 11 is abnormally off, and the counter electromotive force is charged in the DC-link terminal 7 by regeneration of a diode (an anti-parallel diode connected to each switching element within an inverter).

The counter electromotive force is in the opposite direction to a driving direction of the motor, and is in proportion to a speed of the motor (the counter electromotive force of the second motor 5 directly connected to the engine through the belt and the like is in proportion to a speed of the engine), and may be defined by the equation below.

$$E = \lambda_{pm} \times \omega_r$$

where E indicates a counter electromotive force, $\lambda_{pm}$ is a constant of the counter electromotive force, and $\omega_r$ indicates an angular speed of the motor.

In the emergency operation mode according to the present disclosure, the counter electromotive force is charged in a capacitor C within the DC-link terminal 7, and the emergency operation using the DC-link terminal 7, which is charged by the counter electromotive force, as the power is supplied.

It is determined whether the engine 1 is in a driving state (that is, whether the engine is started) when the main relay is off (S13), and when the engine 1 is in a non-driving state (the state where the vehicle travels in the EV mode and the engine clutch is disconnected when the main relay is off), the starting of the engine 1 is attempted by using the counter electromotive force.

That is, the counter electromotive force is generated in the first motor 3 by the driving energy of the vehicle while the vehicle moves, and the engine 1 starts by driving the second motor 5 by using the counter electromotive force of the first motor 3 (S14).

In this case, the counter electromotive force of the first motor 3 by the driving energy of the vehicle is supplied to the second inverter 6 through the DC-link terminal 7, and the second motor 5 is driven by controlling the second inverter 6 to start the engine.

When the starting of the engine by using the counter electromotive force is failed, that is, the second motor 5 cannot sufficiently generate the driving force necessary to start the engine by using the counter electromotive force of the first motor 3, the emergency operation of the vehicle cannot be performed, so that the emergency operation mode is terminated (S19).

When the engine 1 is in the driving state while the main relay 11 is off (the vehicle travels in the HEV mode and the engine clutch is connected when the main relay is off), or the engine 1 starts successfully by using the counter electromotive force (in this case, the engine clutch is in a disconnection state), the counter electromotive force may be generated in the second motor 5 by the power from the engine 1, and the counter electromotive force may be charged in the DC-link terminal 7 through the regeneration of the diode.

As described above, the main relay 11 is off in which the vehicle travels in the EV mode, the starting of the engine 1 is attempted, and the starting of the engine 1 is successful, the counter electromotive force generated in the second motor 5 may be charged in the DC-link terminal 7 as driving the vehicle in the HEV mode.

Accordingly, voltage control of controlling a voltage of the DC-link terminal 7 is performed by using the second motor 5 and the second inverter 6 in the driving state of the engine 1 and the state where the second inverter 6 is controllable, together with charging of the DC-link terminal 7 by the counter electromotive force (S15).

A voltage of the DC-link terminal 7 used as the power source in the emergency operation mode may be uniformly maintained considering stability of driving and output of the high voltage component.

The voltage control of the DC-link terminal 7 is performed so that a uniform voltage level may be maintained by using the second inverter 6 by a voltage controller (not illustrated), and the high voltage component is driven by using the voltage controlled DC-link terminal 7 as the power supply.

In this case, a current is controlled so that corresponding torque is output from the second motor 5 according to a torque command generated by the voltage generator, so that the voltage of the DC-link terminal 7 is controlled, and the voltage controller outputs a torque command demanded by the second inverter 6 to control the second inverter 6.

Here, the torque command for the control of the second inverter 6 may be a value calculated according to a target voltage value of the DC-link terminal 7 and a detection value that is an actual value of the DC-link terminal 7 as represented by a functional formula below. In addition, the torque command may be calculated by a rotational speed and the like of the second motor 5.

$$T^*_{e2} = f(V_{DC\_ref}, V_{DC}, W_{rpm}),$$

where $T^*_{e2}$ indicates a torque command of the voltage controller for the second inverter 6, $V_{DC\_ref}$ indicates a target voltage value of the DC-link terminal 7, $V_{DC}$ indicates an actual voltage detection value of the DC-link terminal 7, and $W_{rpm}$ indicates a rotational speed of the second motor 5.

The voltage controller may be configured to compare the target voltage value ($V_{DC\_ref}$) of the DC-link terminal 7 and the actual voltage detection value ($V_{DC}$) of the DC-link terminal 7 and increase and decrease the torque command according to a difference when generating the torque command.

When the actual voltage detection value ($V_{DC}$) of the DC-link terminal 7 is smaller than the target voltage value ($V_{DC\_ref}$) of the DC-link terminal 7, the voltage controller may generate a regenerative torque command for generating regenerative torque. When the actual voltage detection value ($V_{DC}$) of the DC-link terminal 7 is greater than the target voltage value ($V_{DC\_ref}$) of the DC-link terminal 7, the voltage controller may generate a driving torque command for generating driving torque (when the actual voltage detection value ($V_{DC}$) of the DC-link terminal 7 is equal to the target voltage value ($V_{DC\_ref}$) of the DC-link terminal 7, the torque command is 0).

Accordingly, the voltage controller may adjust the torque command by actively responding to the step-down of the voltage of the DC-link terminal 7 due to the high voltage component or a change in the input counter electromotive force, thereby uniformly maintaining the voltage of the DC-link terminal 7.

In the voltage control process, the voltage of the DC-link terminal 7 needs to be maintained at a level appropriate to the driving of the high voltage component, so that the target voltage value of the DC-link terminal 7 is preset within an appropriate driving voltage range of the high voltage component.

Next, in the state where the DC-link terminal 7 is charged and voltage-controlled, non-problem high voltage components such as a LDC 13 and an EOP 16 are operated by using the DC-link terminal 7, of which the voltage is controlled by the second inverter 6, as the power supply (S17).

The vehicle is driven by using the power from the engine 1, so that the vehicle travels in the emergency operation mode (limp-home mode) (S18).

In this case, the engine clutch 2 needs to be in a connection state so that the power from the engine 1 is transmitted to the wheel 9 through the first motor 3 and the transmission 8, and thus, when the vehicle travels in the EV mode while the main relay 11 is off, a process of connecting the engine clutch 2 is performed, which is not illustrated in FIG. 3.

When the vehicle travels in the HEV mode while the main relay 11 is off, the engine clutch 2 is already in the connection state, so that a process of connecting the engine clutch 2 is not needed.

In the state where the voltage of the DC-link terminal 7 is controlled (S15), zero torque control is performed on the first motor 3 by using the first inverter 4 (S16), thereby improving voltage control performance of the DC-link terminal 7 in a high speed region.

When the voltage of the DC-link terminal 7 is controlled by using the second motor 5 and the second inverter 6 as described above, and excessive counter electromotive force (that is, regenerative energy) is generated by the first motor 3 in the high speed region, the voltage control performance for the DC-link terminal 7 may deteriorate.

Particularly, when it is assumed that an output of the second motor 5 is 8 kW (a voltage controllable capacity of the second motor), an output of the first motor 3 is 35 kW (a voltage controllable capacity of the first motor), and the regenerative energy by the first motor 3 exceeds 8 kW, it is impossible to control the voltage of the DC-link terminal 7.

That is, when the voltage of the DC-link terminal 7 is controlled, it is necessary to control the regenerative energy by the first motor 3 to be equal to or smaller than a maximum output capacity of 8 kW, that is, a voltage controllable range by the second motor 5. The torque of the first motor 3 needs to be controlled such that the output of the first motor 3 is smaller than 8 Kw.

In order to control the voltage of the DC-link terminal 7, the torque of the first motor 3 is controlled by using the first inverter 4 so that the regenerative energy of the first motor 3 is equal to or smaller than the maximum output of the second motor 5 during the process of the emergency operation by driving the high voltage components such as the LDC 13 and the EOP 16 and the process of driving the vehicle by using the power from the engine 1.

When the voltage of the DC-link terminal 7 is controlled by using the second motor 5 and the second inverter 6, the torque of the first motor 3 is controlled to be smaller than the maximum output of the second motor 5.

The first motor 3 may be controlled to be 0 by using the first inverter 4. When the torque of the first motor 3 is not 0, the first motor 3 performs regeneration by the size of the torque so that the size of the torque needs to be additionally reflected when the voltage of the DC-link terminal 7 is controlled.

The emergency operation method according to the exemplary embodiment of the present inventive concept will be described with reference to FIG. 3, in which the DC-link terminal 7 is charged with the counter electromotive force generated by the first motor 3 and the second motor 5. When the vehicle is in the EV mode while the main relay 11 is off, starting of the engine is attempted by using the counter electromotive force of the second motor 5, the high voltage component is re-operated by using the DC-link terminal 7, of which the voltage is controlled by the second motor 5 and the second inverter 6 as the power supply, in which the vehicle is in the HEV mode or the engine starts successful after the EV mode. The vehicle is then driven in the limp home mode (emergency operation mode) by using the power from the engine 1 in a connection state of the engine clutch 2.

According to the present disclosure, even though the main relay 11 is abnormally off, power necessary for driving the high voltage component, such as the LDC 13 and the EOP 16, may be provided, and the emergency operation of driving the vehicle by using the power from the engine 1 may be performed.

It is also possible to prevent the low voltage (12V) battery 14 from being discharged by operating the LDC 13.

According to the present disclosure, even though the vehicle travels in the EV mode while the main relay 11 is off, an immediate emergency operation of the vehicle can be performed through the starting of the engine by using the counter electromotive force, and further, the first motor 3 is zero torque controlled to prevent voltage control performance in the high speed region from deteriorating while the voltage of the DC-link terminal 7 is controlled by using the first motor 3 and the first inverter 4.

Figure 4:
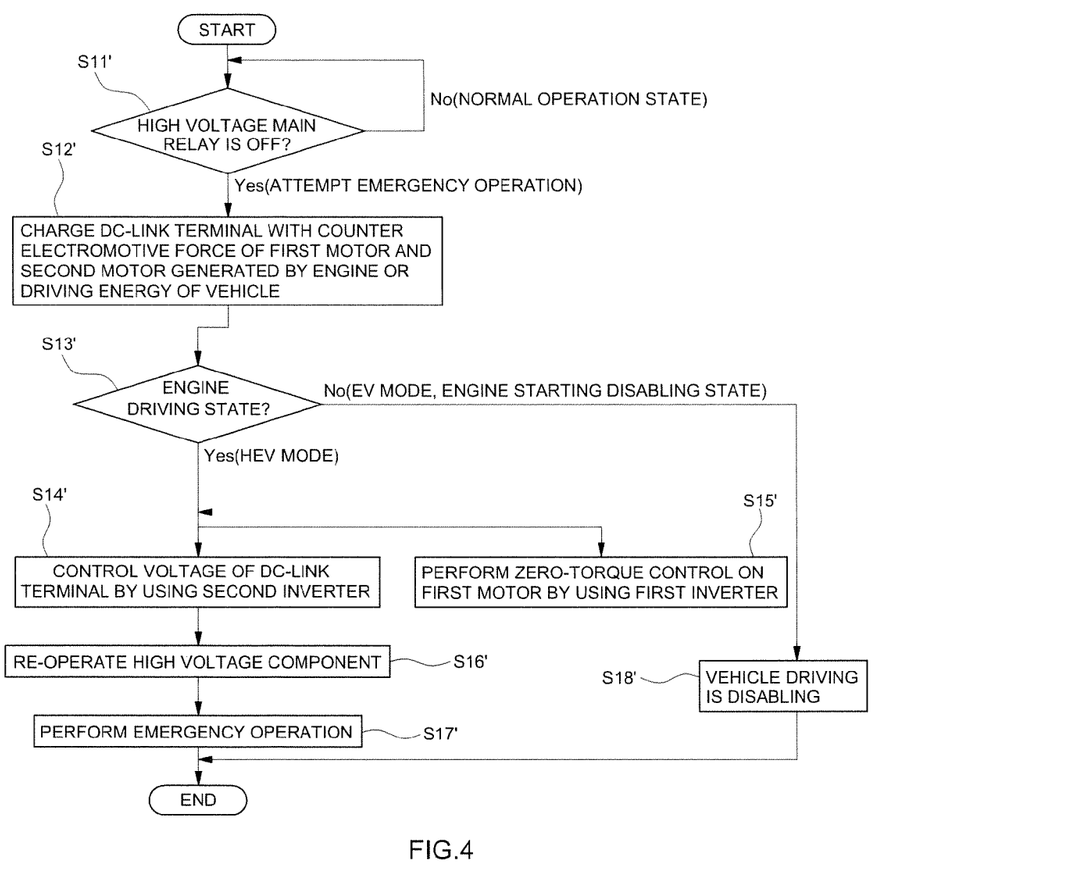
FIG. 4 is a flowchart illustrating an emergency operation method of a hybrid vehicle according to another exemplary embodiment of the present inventive concept.

FIG. 4 is a flowchart illustrating an emergency operation method of the hybrid vehicle according to another exemplary embodiment of the present inventive concept, which is different from the exemplary embodiment of FIG. 3 in that the process of attempting to start the engine is omitted in the EV mode when the main relay 11 is off.

That is, in the exemplary embodiment of FIG. 4, when the vehicle travels in the EV mode (or the engine is currently at a start disabling state) while the main relay 11 is off, the engine 1 is not in the driving state, so that the emergency operation mode is terminated.

The DC-link terminal 7 is charged with the counter electromotive force (S12"), and when the engine 1 is in the driving state (the state where the vehicle travels in the HEV mode and the engine clutch is connected while the main relay is off), the voltage control of controlling the voltage of the DC-link terminal 7 by using the second motor 5 and the second inverter 6 in the state where the second inverter 6 is controllable is performed (S13' and S14") together with charging the DC-link terminal 7 with the counter electromotive force.

Process S16" of re-operating the high voltage component by using the DC-link terminal 7 as a power supply in the state where the charging and the voltage control of the DC-link terminal 7 are performed, process S17" of driving the vehicle by using the power from the engine 1 in the connection state of the engine clutch 2, and process of S15" of performing zero torque control on the first motor 3 by using the first inverter 4 in the state where the voltage of the DC-link terminal 7 is controlled are the same as those of the exemplary embodiment of FIG. 3.

In the exemplary embodiment of FIG. 4, when the main relay 11 is off while the vehicle travels in the EV mode, it is impossible to immediately drive the vehicle, but an immediate emergency operation of the vehicle may be performed through the charging and the control of the voltage of the DC-link terminal 7 when the main relay 11 is off while the vehicle travels in the HEV mode.

In the exemplary embodiment of FIG. 4, the first motor 3 is zero torque controlled while the voltage of the DC-link terminal 7 is controlled, thereby preventing voltage control performance in the high speed region from deteriorating.

Figure 5:
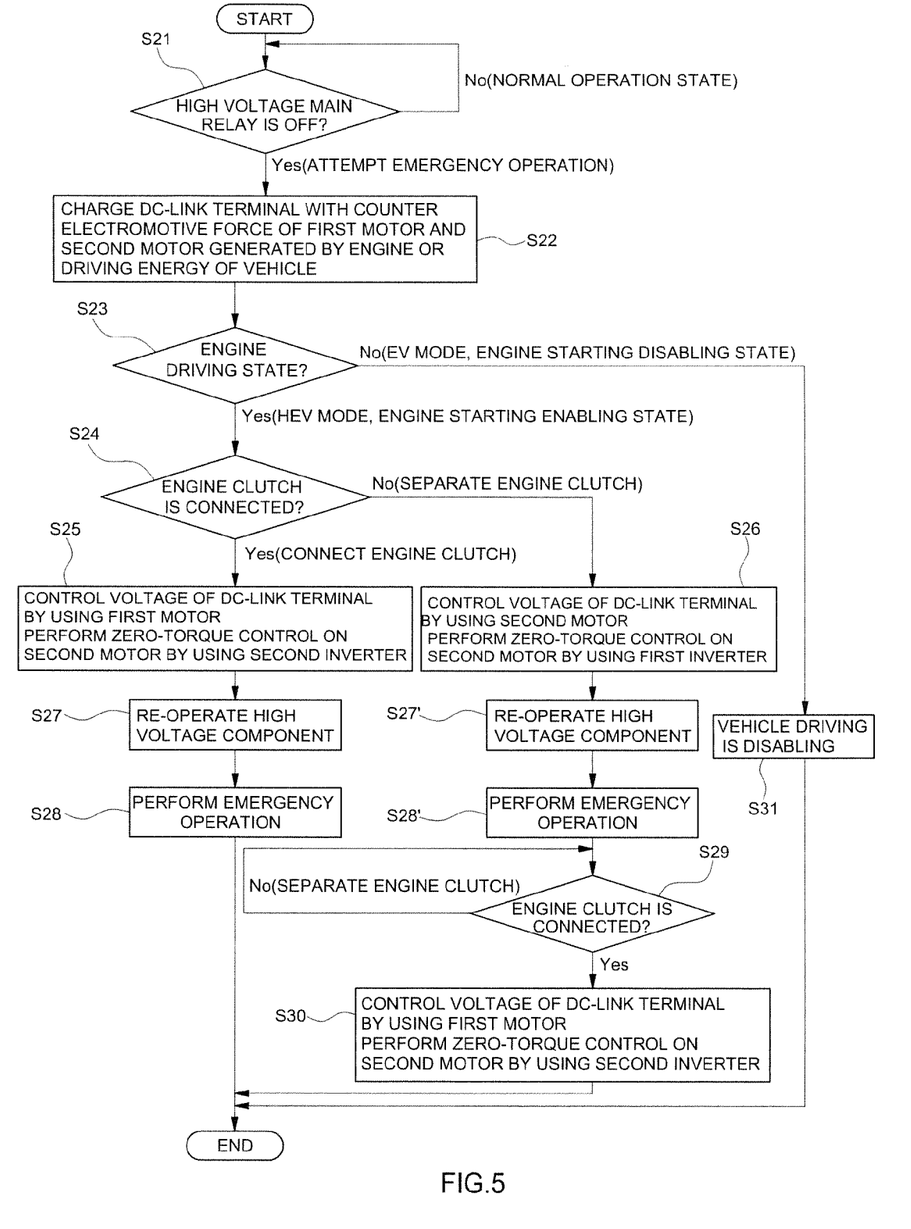
FIG. 5 is a flowchart illustrating an emergency operation method of a hybrid vehicle according to yet another exemplary embodiment of the present inventive concept.

FIG. 5 is a flowchart illustrating an emergency operation method of a hybrid vehicle according to yet another exemplary embodiment of the present inventive concept, in which voltage control performance can be improved in the high speed region during the emergency operation through the control of the DC-link terminal.

First, it is determined whether the high voltage main relay 11 is off during travelling of the vehicle (S21), and when the main relay 11 is not off and is in a normal state, a normal operation is maintained, and when the main relay 11 is abnormally off, a mode of the hybrid vehicle enters an emergency operation mode (limp-home mode) and the emergency operation is performed.

When the mode of the hybrid vehicle enters the abnormal operation mode as described above, the DC-link terminal 7 is charged with the counter electromotive force of the first motor (MG1) 3 and the second motor (MG2) 5 generated by driving energy of the vehicle or the power from the engine 1.

It is determined whether the engine 1 is in a driving state (that is, whether the engine is started) when the high voltage main relay is off (S23), and when the engine 1 is in the non-driving state (the state where the vehicle travels in the EV mode and the engine clutch is disconnected when the main relay is off), the starting of the engine 1 is attempted by using the counter electromotive force.

Here, when the starting of the engine by using the counter electromotive force has failed, that is, the second motor 5 cannot sufficiently generate the driving force necessary to start the engine by using the counter electromotive force of the first motor 3, the emergency operation of the vehicle cannot be performed, so that the emergency operation mode is terminated.

When the engine 1 is in the driving state while the main relay 11 is off (the vehicle travels in the HEV mode and the engine clutch is connected when the main relay is off), or the engine 1 starts successfully by using the counter electromotive force (in this case, the engine clutch is in the disconnection state), the counter electromotive force may be generated in the second motor 5 by the power from the engine 1, and the counter electromotive force may be charged in the DC-link terminal 7 through the regeneration of the diode.

As described above, when the main relay 11 is off when the vehicle travels in the EV mode, the starting of the engine 1 is attempted. If the starting of the engine 1 is successful, the counter electromotive force generated in the second motor 5 may be charged in the DC-link terminal 7 similar to the travelling of the vehicle in the HEV mode.

The above process is not different from that of the exemplary embodiment of FIG. 3.

When the main relay 11 is off while the vehicle travels in the EV mode, a process of attempting the starting of the engine may be included, but the configuration of terminating the emergency operation mode when the main relay is off in the EV mode or the starting of the engine is in a disabling state (S31), and performing the emergency operation when the main relay is off in the HEV mode is applicable.

In the exemplary embodiment of FIG. 5, the voltage of the DC-link terminal 7 is basically controlled by using the first motor 3 and the first inverter 4 together with charging the DC-link terminal 7 by the counter electromotive force in the state where the engine clutch 2 is connected (S24 and S25), and the vehicle is emergency-operated by using the DC-link terminal 7 as the power supply in the state where the voltage of the DC-link terminal 7 is controlled (S27 and S28), and the zero-torque control is performed on the second motor 5 by using the second inverter 6.

That is, properly functioning high voltage components, such as the LDC 13 and the EOP 16, are re-operated by using the DC-link terminal 7 as the power supply (S27), and the vehicle is emergency-operated by using the power from the engine 1 (S28).

Here, the exemplary embodiment of FIG. 5 is different from those of FIGS. 3 and 4 in that the voltage of the DC-link terminal is controlled by the first motor 3 and the first inverter 4, and the zero-torque control target is the second motor 5.

Thus, it is necessary to control the regenerative energy by the second motor 5 to be equal to or smaller than the maximum output capacity that is the voltage controllable range by the first motor 3 when the voltage of the DC-link terminal 7 is controlled. When the torque of the second motor 5 is controlled, the torque of the second motor 5 needs to be controlled so that the output of the second motor 5 has the torque smaller than the maximum output of the first motor 5.

The torque of the second motor 5 is controlled to have a torque smaller than the maximum output of the first motor 3 in order to control the voltage of the DC-link terminal 7 during the process of the emergency operation by driving the high voltage component, such as the LDC 13 and the electronic oil pump 16, and the process of driving the vehicle by using the power from the engine.

In this case, the second motor 5 may be controlled to have 0 torque (Nm) by using the second inverter 6, and when the torque of the second motor 5 is not 0, the second motor performs regeneration so that the torque needs to be additionally reflected when the voltage of the DC-link terminal 7 is controlled.

In the exemplary embodiment of FIG. 5, the voltage control subject and the zero torque control target are changed as described above in the control of the voltage of the DC-link terminal and the zero-torque control of the motor, however, the method in the exemplary embodiment of FIG. 5 is not different from those of FIGS. 3 and 4, and a detailed description of the process and the method of controlling the voltage will be omitted.

It is determined whether the engine clutch 2 is connected (S24), and when the engine clutch 2 is disconnected similar to the case where the main relay 11 is off while the vehicle travels in the EV mode, the voltage of the DC-link terminal is controlled by using the second motor 5 and the second inverter 6, and the zero-torque control is performed on the first motor 3 by using the first inverter 4 (S26), and the emergency operation of the vehicle is performed by using the DC-link terminal 7 as the power supply (S27" and S28"), similar to the exemplary embodiments of FIGS. 3 and 4.

Next, when the engine clutch 2 is connected through the control of the hydraulic pressure in the state where the electronic oil pump 16 is driven, and then the engine clutch 2 is connected, the voltage of the DC-link terminal is controlled by using the first motor 3 and the first inverter 4, and the zero-torque control is performed on the second motor 5 by using the second inverter (S29 and S30), and the emergency operation of the vehicle is performed by using the DC-link terminal 7 as the power supply.

In the configuration of the hybrid vehicle, as illustrated in FIGS. 1 and 2, when the first motor 3 is connected to the engine 1 with the engine clutch 2 interposed therebetween and is connected to transmit the power to the wheel side 9 of the vehicle to be mainly used for driving the vehicle. When the second motor 5 is directly connected to the engine 1 through the belt and the like to be mainly used for starting the engine, a voltage controllable capacity (for example, 35 kW) through the first inverter 4 is greater than a voltage controllable capacity (for example, 8 kW) through the second inverter 6. When the engine clutch 2 is connected, the control of the voltage through the first inverter 4 is excellent.

In the exemplary embodiment of FIG. 5, it is determined whether the engine clutch 2 is connected as described above, and when the engine clutch 2 is connected, the voltage of the DC-link terminal 7 is controlled by using the first inverter 4, and the zero-torque control is performed on the second motor 5 by using the second inverter 6.

When the engine clutch 2 is disconnected, the voltage of the DC-link terminal 7 is controlled by using the second inverter 6, and the zero-torque control is performed on the first motor 3 by using the first inverter 4.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. An emergency operation method of a hybrid vehicle which includes an engine, a first motor connected to the engine through an engine clutch and transmitting power to a wheel of the vehicle, and a second motor connected with the engine to directly transmit power, the method comprising steps of:

charging a direct current (DC)-link terminal with a first counter electromotive force of the first motor generated by driving energy of the vehicle transmitted from the wheel or a second counter electromotive force of the second motor generated by power of the engine when a main relay is off while the vehicle travels;

controlling a voltage of the DC-link terminal by using a second inverter connected between the DC-link terminal and the second motor in a driving state of the engine; and supplying power by using the DC-link terminal, of which the voltage is controlled, for an emergency operation of the vehicle, wherein in the step of controlling the voltage of the DC-link terminal, a torque of the first motor is controlled so that an output of the first motor is equal to or smaller than a maximum output of the second motor.

2. The emergency operation method of claim 1, wherein the step of controlling the voltage of the DC-link terminal includes controlling the torque of the first motor to be zero.

3. The emergency operation method of claim 1, before the step of controlling the voltage, further comprising a step of:
  determining whether the engine is in the driving state when the main relay is off, and starting the engine by using the first counter electromotive force by the driving energy of the vehicle when the engine is not in the driving state.

4. The emergency operation method of claim 1, wherein the step of supplying the power includes driving the vehicle by using the power from the engine while the engine clutch is connected.

5. The emergency operation method of claim 1, wherein step of supplying the power includes driving a high voltage component by using the DC-link terminal.

6. The emergency operation method of claim 5, wherein the high voltage component includes the engine clutch and an electronic oil pump for hydraulic pressure of a transmission.

7. The emergency operation method of claim 1, wherein the step of controlling the voltage of the DC-link terminal includes controlling the second inverter according to a torque command for maintaining a predetermined voltage, so that a torque according to the torque command is output from the second motor.

8. The emergency operation method of claim 7, wherein the torque command for controlling the second inverter is calculated according to a target voltage value of the DC-link terminal, a voltage detection value of the DC-link terminal, and a rotational speed of the second motor.

9. The emergency operation method of claim 8, wherein the step of controlling the voltage of the DC-link terminal includes generating a regenerative torque command when the voltage detection value of the DC-link terminal is smaller than a predetermined target voltage value of the DC-link terminal, and generating a driving torque command when the voltage detection value of the DC-link terminal is greater than the target voltage value of the DC-link terminal.

10. An emergency operation method of a hybrid vehicle which includes an engine, a first motor connected to the engine through an engine clutch and transmitting power to a wheel of the vehicle, and a second motor connected with the engine to directly transmit power, the method comprising steps of:
  charging a DC-link terminal with a first counter electromotive force of the first motor generated by driving energy of the vehicle transmitted from the vehicle wheel or a second counter electromotive force of the second motor generated by power of the engine when a main relay is off while the vehicle travels;
  determining whether the engine clutch is in a connection state;
  controlling a voltage of the DC-link terminal by using a first inverter connected between the DC-link terminal and the first motor in an engine driving state, and controlling a torque of the second motor so that an output of the second motor is equal to or smaller than a maximum output of the first motor when the engine clutch is in the connection state; and
  supplying power by using the DC-link terminal, of which the voltage is controlled, for an emergency operation of the vehicle.

11. The method of claim 10, wherein the step of controlling the voltage of the DC-link terminal includes controlling the torque of the second motor to be zero.

12. The emergency operation method of claim 10, wherein
  when the engine clutch is in a disconnection state, the voltage of the DC-link terminal is controlled by using a second inverter which is connected between the DC-link terminal and the second motor and a torque of the first motor is controlled so that an output of the first motor is equal to or smaller than a maximum output of the second motor in the engine driving state.

13. The emergency operation method of claim 12, wherein the controlling of the voltage when the engine clutch is in the disconnection state includes controlling the torque of the first motor to be zero.

14. The emergency operation method of claim 12, wherein a high voltage component is driven by the power supplied from the DC-link terminal when the engine clutch is disconnected while the voltage of the DC-link terminal is controlled by using the second inverter, and then, the engine clutch is connected to control the voltage of the DC-link terminal by using the first inverter connected between the DC-link terminal and the first motor in the connection state of the engine clutch.

15. The emergency operation method of claim 12, wherein when the voltage of the DC-link terminal is controlled by using the first inverter, the torque of the second motor is controlled so that the output of the second motor is equal to or smaller than the maximum output of the first motor.

16. The emergency operation method of claim 15, wherein the torque of the second motor is controlled to be zero.

17. The emergency operation method of claim 10, further comprising:
  determining whether the engine is in the driving state when the main relay is off, and starting the engine by using the first counter electromotive force by the driving energy of the vehicle when the engine is not in the driving state.

18. The emergency operation method of claim 10, wherein the step of supplying the power by using of the DC-link terminal includes driving the vehicle by using the power from the engine when the engine clutch is in the connection state.

19. The emergency operation method of claim 10, wherein the step of supplying the power by using of the DC-link terminal includes driving a high voltage component by using the DC-link terminal as a power supply.

20. The emergency operation method of claim 10, wherein the high voltage component includes the engine clutch and an electronic oil pump for hydraulic pressure of a transmission.

21. The emergency operation method of claim 10, wherein the step of controlling the voltage of the DC-link terminal includes controlling the first inverter according to a torque command for maintaining a predetermined voltage, so that torque according to the torque command is output from the first motor.

22. The emergency operation method of claim 21, wherein the torque command for controlling the first inverter is calculated according to a target voltage value of the DC-link terminal, a voltage detection value of the DC-link terminal, and a rotational speed of the first motor.

23. The emergency operation method of claim 22, wherein the step of controlling the voltage of the DC-link terminal includes generating a regenerative torque command when the voltage detection value of the DC-link terminal is smaller than a predetermined target voltage value of the DC-link terminal, and generating a driving torque command when the voltage detection value of the DC-link terminal is greater than the target voltage value of the DC-link terminal.

* * * * *